United States Patent [19]

Hassan et al.

[11] 4,306,509

[45] Dec. 22, 1981

[54] VACUUM DRUM PLANTER

[75] Inventors: Awatif E. Hassan; H. Moustafa Hassan, both of Raleigh, N.C.

[73] Assignee: North Carolina State University at Raleigh, Raleigh, N.C.

[21] Appl. No.: 18,623

[22] Filed: Mar. 8, 1979

[51] Int. Cl.³ ............................ A01C 7/04; A01C 7/20
[52] U.S. Cl. ...................................... 111/34; 111/74; 111/89; 111/90; 111/77; 221/211
[58] Field of Search .................... 111/77, 74, 34, 90, 111/78, 89; 221/211; 251/4, 7

[56] References Cited

U.S. PATENT DOCUMENTS

| | | | |
|---|---|---|---|
| 1,227,628 | 5/1917 | Kiefer | 251/7 X |
| 2,445,698 | 7/1948 | Siebring | 111/77 |
| 3,156,201 | 11/1964 | Tweedale | 111/77 |
| 3,387,746 | 6/1968 | Whipple | 111/34 X |
| 3,770,164 | 11/1973 | Hembree | 221/211 |
| 3,843,018 | 10/1974 | Holmes et al. | 111/77 X |
| 3,872,805 | 3/1975 | Kolk | 111/77 X |
| 4,145,980 | 3/1979 | Boots | 111/34 X |

FOREIGN PATENT DOCUMENTS

| | | | |
|---|---|---|---|
| 218569 | 5/1957 | Australia | 111/34 |
| 91940 | 1/1962 | Denmark | 111/77 |
| 104084 | 6/1966 | Denmark | 111/78 |
| 161983 | 4/1964 | U.S.S.R. | 111/34 |
| 444514 | 11/1974 | U.S.S.R. | 111/89 |
| 533349 | 11/1976 | U.S.S.R. | 111/89 |

Primary Examiner—Steven A. Bratlie
Attorney, Agent, or Firm—Bell, Seltzer, Park and Gibson

[57] ABSTRACT

An apparatus for continuously metering seeds onto a seedbed and simultaneously pressing the seeds into the soil. The seed planting apparatus includes a drum adapted to be moved in rolling contact across the seedbed, and which transports seeds on its peripheral wall from a hopper to the seedbed. The seeds are retained against apertures in the peripheral wall by means of a vacuum transmitted to the apertures through manifolds within the drum that are interconnected with a vacuum pump by means of individual hoses. A cam interrupts the vacuum by compressing the hoses when the seed-bearing apertures contact the seedbed, thereby releasing the seeds and pressing them into the soil. The seeds are preferably placed on the seedbed in a uniformly spaced array predetermined by the uniform alignment and spacing of the apertures on the wall of the drum. An air brush is also included to remove substantially all seeds in excess of one from the apertures before the apertures rotate from beneath the hopper, and a brush removes soil and debris from the exterior wall of the drum before the apertures re-enter the hopper.

8 Claims, 5 Drawing Figures

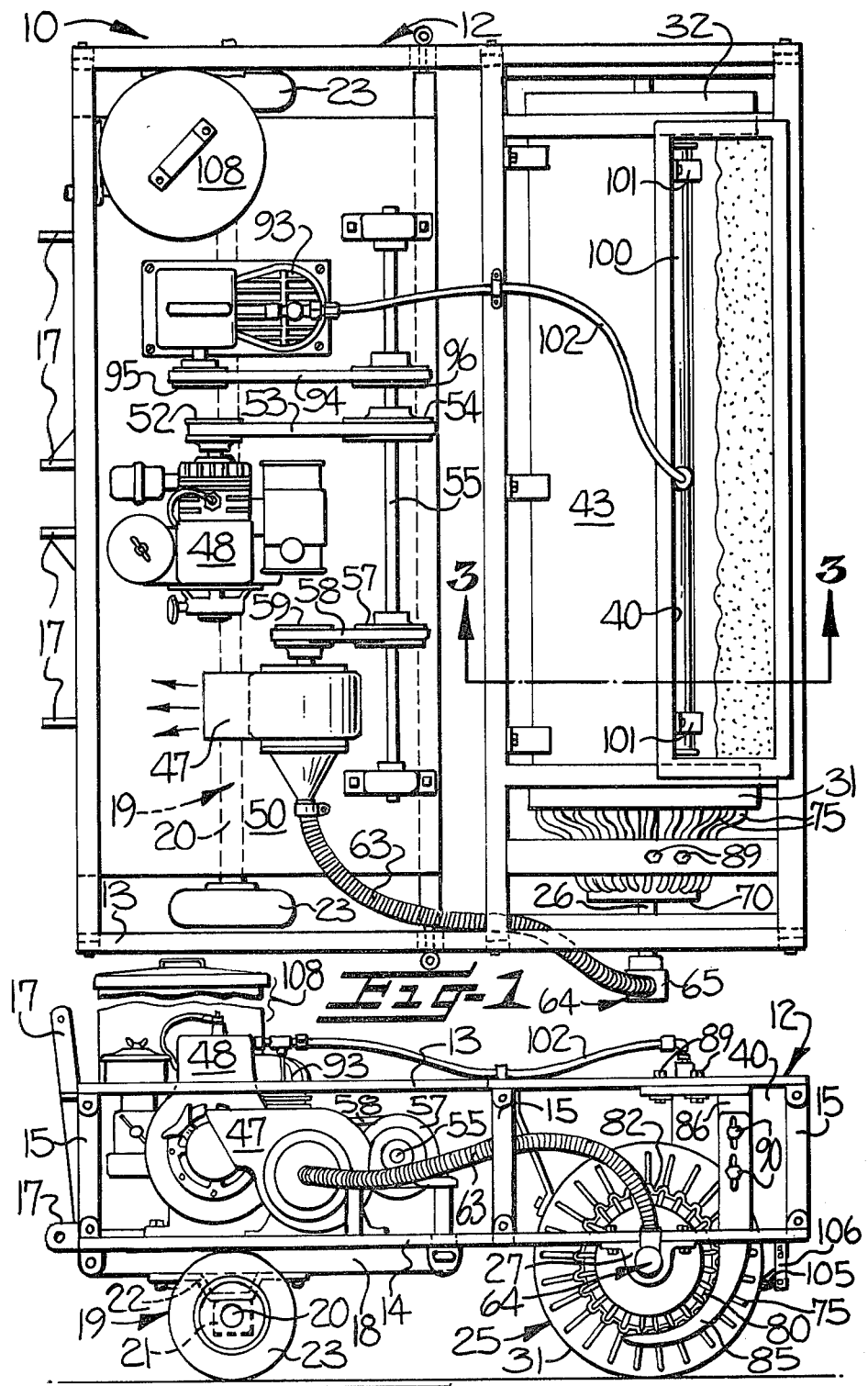

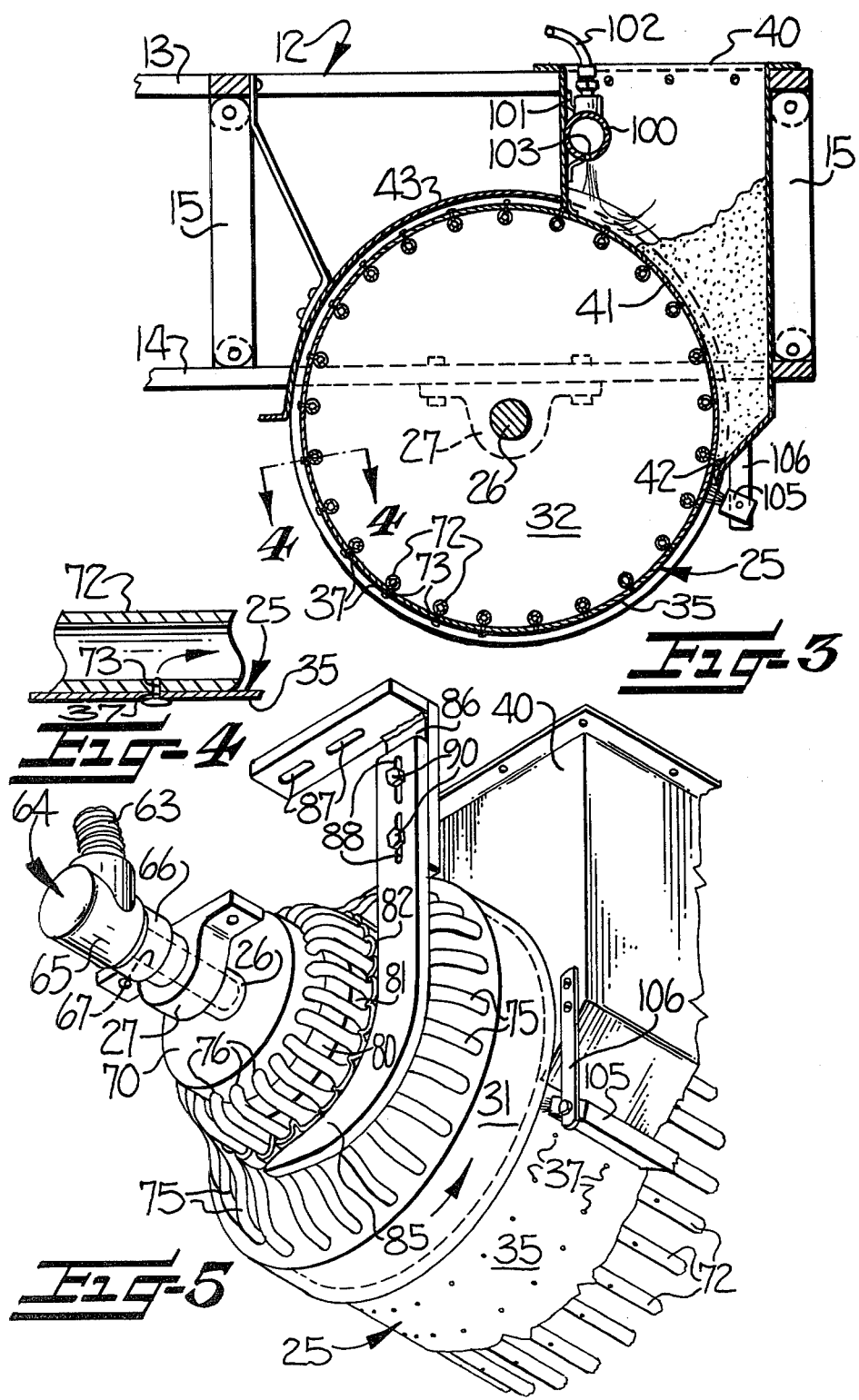

VACUUM DRUM PLANTER

FIELD OF THE INVENTION

The present invention relates to an apparatus for continuously metering seeds onto a seedbed, such as a prepared nursery bed, cultivated land, or the like, and simultaneously pressing or packing the seeds into the soil. More specifically, the invention concerns a seed planting apparatus adapted for precision seeding whereby individual seeds are dispensed in a uniformly spaced array on the seedbed so that each seed can germinate in plots of predetermined dimensions.

BACKGROUND OF THE INVENTION

Forestry and agriculture are frequently concerned with planting or replanting extensive acreage for crop production, reforestation, land reclamation, and other similar purposes. Although some crops or stands or timber restock naturally, planting or replanting generally requires manual assistance either by seeding the field production site or by planting nursery-grown seedlings thereon. Particularly with regard to reforestation and afforestation, the preferred method of planting is by the transplantation of seedlings rather than by direct seeding. In this manner, control over the development of the seedlings can be closely maintained by supervision of soil conditions, fertilization, irrigation, growth characteristics, and related factors. High quality planting stock can thereby be produced for transplantation, and the problems attendant to seed germination and initial growth of the seedling can be avoided in the field.

Automated systems are currently used to plant seedlings for the production of a harvestable crop or stand of trees. In order to take advantage of such systems, however, it is necessary to produce individual and discreet seedlings that can be singularly fed to automatic devices. Thereby, the crop or stand can be planted with the desired density or concentration by positioning the seedlings singularly within the ground surface and by regulating the spacing between the seedlings. Kolk et al. U.S. Pat. No. 3,872,805 illustrates such an automated device which plants rooted seedlings at regular intervals as the machine advances.

The process of providing individual seedlings for transplantation is known as seedling singularization, and such can be achieved upon planting of the seeds in a seedbed, while the seedlings are growing in the bed, at the time the seedlings are lifted, or when the seedlings are sorted prior to transplantation. To reduce manual operations, including removal of extraneous and intertwined seedlings, singularization at the time the seeds are planted in the seedbed is preferred. Such is commonly achieved by precision seeding, i.e., planting the seeds in a uniformly spaced array wherein a single seed occupies the center of a plot of predetermined dimensions.

Precision seeding furthermore produces additional benefits in that uniform seedlings are produced, which are more amenable to automatic planting. For example, seed spacing studies have shown that the optimum spacing for loblolly pine seeds is one seed per 2- by 3-inch plot, or 16 rows in a 4-foot seedbed, so as to provide a seeding density of 24 seeds per square foot. Under such conditions large and uniform seedlings are produced, and the extent and degree of sorting and grading are commensurately reduced. By precision seeding, maximum utility is made of the nursery growing area and postseeding operations are facilitated.

Automatic precision seeding is typically performed by devices which meter a supply of seeds onto a seedbed by selecting individual seeds from the supply at a predetermined rate or density, transporting the seeds to the vicinity in which the seeds are to be planted, and discharging the seeds onto the seedbed. The efficiency and accuracy with which these functions are performed, however, varies according to the structural limitations of the particular devices. For example, Whipple U.S. Pat. No. 3,387,746 discloses a rotary-type planting device that singly delivers seeds to a seedbed by means of a rotating metering wheel which carries the seed from a seed chamber to discharge channels or tubes positioned above the seedbed. A vacuum is applied to ports on the wheel as they rotate through the seed chamber and to the discharge channels thereby selecting and delivering singular seeds. When the ports are positioned above the discharge channel, compressed air drives the seed from the port and through the delivery channels to the seedbed.

Seed placement by the planting device disclosed in the Whipple patent would appear to be imprecise. Because the seed is dropped or blown in a vertical distance down the discharge channels and to the seedbed, there would be a tendency for the seed to scatter upon impact with the soil, thereby producing uneven and staggered spacing. Furthermore, the passage of the seeds into and out of the ports and through the discharge channels is more likely to cause damage to the seeds thereby eliminating the advantages derived from handling the seeds with a vacuum system. The greater disadvantage, however, is the absence of any means by which the seed can become implanted into the soil of the seedbed. With no method or apparatus for covering the deposited seed or for pressing the seed into the soil, the seed is subject to being removed by predators or displaced by winds or water drainage.

A planting apparatus having the capacity to close a previously opened furrow into which seeds have been deposited is illustrated in Tweedale U.S. Pat. No. 3,156,201. By this device, a ground engaging press wheel, separate from the seed metering drum, travels at the trailing end of the planter and pushes soil over the deposited seed. When precision seeding with seeds spaced as close as 2 inches is desired, however, this method of covering the seed would seem to cause further disruption of the uniform array of seeds since pushing the soil would move the seeds from their deposited location.

The metering drum in the Tweedale patent has other limitations in that the seeds must drop a vertical distance to the seedbed. As explained above, scattering can result from this practice. In addition, the metering drum is subject to spacing the seeds on the seedbed at variable distances with changing speeds of rotation of the drum relative to the rate at which the apparatus is advanced. When the relative speed is other than zero, however, scattering of the seed can result because of the horizontal velocity imparted to the seed, consequently affecting the uniform spacing between seeds.

It is accordingly an object of the present invention to provide a seed planting apparatus that is adapted to continuously meter seeds onto a seedbed or the like and simultaneously press the seeds into the soil.

A further object of this invention is to provide an automatic precision seeding appratus which is capable of containing seeds preparatory to planting, metering the seeds according to predetermined spacing and density, transporting the seeds to the seedbed, releasing the seeds on the seedbed, and implanting the seeds within the soil.

It is another object of the present invention to provide a seed planting apparatus that distributes seed on the seedbed in a predetermined, uniformly spaced array so that seedling singularization is facilitated. In this connection, it is also an object of this invention to provide an apparatus that seeds multiple rows in the direction of travel and with close proximity between rows and successive seeds to produce a high density of seeds per unit of seedbed surface area. Also in this regard, another object of the present invention is to provide a seed planting aparatus which is capable of seeding at a density that is independent of the ground speed at which the apparatus moves.

Another object of this invention is the provision of a seed planting apparatus that transports the seeds to the seedbed by means of a vacuum system, whereby the seeds are handled with a minimum of damage and so that predominantly singular seeds are planted to a predetermined plot of given dimensions on the surface of the seedbed.

Still another object of the invention is the provision of a seed planting apparatus that is adapted to operate on nursery prepared seedbeds or in the field for either direct seeding or the preparation of seedlings for subsequent transplantation.

SUMMARY OF THE INVENTION

These and other objects and advantages of the present invention are achieved in the embodiment illustrated herein by the provision of a seed planting apparatus which comprises a frame having a drum mounted thereon so as to be adapted to be moved in rolling contact across the seedbed. The drum includes a plurality of apertures extending through the cylindrical peripheral wall of the drum, and in the preferred embodiment, the apertures are aligned in circumferential and longitudinal rows and uniformly spaced circumferentially and longitudinally over substantially the full area of the wall. A hopper for receiving a quantity of seed is fixedly mounted to the frame and includes an open delivery end for supporting the seed on a portion of the exterior side of the peripheral wall.

Vacuum means selectively reduces the atmospheric pressure within the apertures as the drum rolls along the seedbed so that the pressure is reduced during movement of the apertures through the hopper and to the seedbed, but such that the pressure is released upon contact of the apertures with the seedbed. In the preferred embodiment, the vacuum means includes a plurality of manifolds each of which operatively communicates with at least one longitudinal row of apertures. A vacuum source and a plurality of flexible hoses interconnecting the vacuum source and an associated manifold supply a reduced atmospheric pressure within the interior of the manifold, and cam means mounted on the frame successively collapses each hose during a portion of the rotation of the drum to thereby interrupt the reduction of pressure.

In this manner, the seeds in the hopper are held against the apertures by the reduced pressure and are carried on the periphery of the drum from the hopper to the seedbed as the drum is rolled over the seedbed. Thus, the seeds are metered and retained on the periphery of the drum in a predetermined array. At substantially the point at which the seeds contact the seedbed, the seeds are released and pressed into the soil by the weight of the apparatus as it rolls over the released seeds. There can also be included within the hopper, means for removing excess seeds which are held against the apertures. Means for continuously removing soil or other debris from the exterior wall of the drum while the drum rotates can furthermore be mounted to the frame.

BRIEF DESCRIPTION OF THE DRAWINGS

Some of the objects and advantages of the invention having been stated, others will appear as the description proceeds, when taken in connection with the accompanying drawings, in which—

FIG. 1 is a top view of a seed planting apparatus embodying the features of the present invention;

FIG. 2 is a side view of the apparatus shown in FIG. 1, and illustrating the location and position of the cam;

FIG. 3 is a sectional side view of the drum, hopper means, and associated components, and taken substantially along the line 3—3 of FIG. 1;

FIG. 4 is a sectional view of the peripheral wall of the drum and a manifold taken substantially along the line 4—4 of FIG. 3 and illustrating the retention of a seed against an aperture; and FIG. 5 is a perspective view of one end of the drum, and illustrating the cam and elements of the vacuum means.

DESCRIPTION OF THE ILLUSTRATED EMBODIMENT

Referring more specifically to the drawings, the illustrated embodiment of the apparatus is indicated generally at 10 and will be seen to include a generally rectangular frame 12 having an upper trailing arm 13 and a lower trailing arm 14 joined by interconnecting struts 15 to form a parallelogram linkage. Connecting members 17 are secured to the frame to provide means for releasably attaching the apparatus 10 to a towing vehicle (not shown) such as a tractor or the like. The connecting members 17 are also secured to a platform frame 18 for mounting certain components as described hereinafter. A wheel assembly 19 is mounted on the platform frame 18 to support one end of the frame 18, or in the alternative, the frame can be supported by the towing vehicle itself, thereby eliminating the need for the wheel assembly 19. As shown in the illustrated embodiment, the wheel assembly 19 includes a shaft 20 extending transversely below the frame, and which is rotatably mounted by bearings 21 that receive the ends of the shaft. Secured to the lower frame structure are suspension members 22, which mount the bearings 21 in an opposing relationship at opposite sides of the frame 18. Wheels 23 are affixed to the shift 20 so that most of the weight of the apparatus 10 is carried by the wheels when the apparatus is towed over the seedbed.

A hollow drum 25 is rotatably mounted on the lower arm 14 at substantially the rear end of the frame 12 and so as to extend horizontally and transversely between the sides of the frame. To mount the drum 25, a hollow axle 26 is rotatably received in bearings 27, which are clamped to the lower frame structure 14 by mounting members. Disks 31 and 32 are also secured coaxially about the axle 26 so that the disks are rotatable with the axle. The drum 25 includes a cylindrical peripheral wall 35, the ends of which are affixed to the interior sides of the disks 31 and 32 so that the peripheral wall 35 is concentric with the rotational axis of the axle 26. Thereby, the drum 25 is adapted to be moved in rolling contact across the seedbed. As illustrated in FIGS. 1 and 5, the diameter of the disks 31 and 32 is slightly greater than the diameter of the peripheral wall 35 so that most of the weight of the trailing arm frame structure is carried by the disks. As the apparatus 10 is moved over the seedbed, however, the disks 31 and 32 will press into the soil so that the peripheral wall 35 contacts the surface of the seedbed between the disks.

Extending through the peripheral wall 35 of the drum 25 are a plurality of apertures 37. As will be further explained, the apertures 37 carry seeds to the seedbed and are essentially the means by which the seeds are metered thereon. While any arrangement of the apertures on the wall of the drum is possible, the desired pattern in which the seeds are to be placed on the seedbed is determinative. Thus, in one embodiment wherein individual loblolly pine seeds were to be positioned in plots having 2- by 3-inch dimensions, the apertures 37 were aligned in circumferential and longitudinal rows and uniformly spaced circumferentially and longitudinally over the full area of the wall 35. Spacing between adjacent apertures of the longitudinal rows was set at 3 inches, and spacing between adjacent apertures in a circumferential row of the drum was 2 inches. With a drum 48 inches in length, 16 rows of seeds were planted on the seedbed with the rows spaced 3 inches apart and the seeds in each row spaced 2 inches apart.

Other arrangements of the seeds on the seedbed may also be accomplished by changing the spacing, the number, or the alignment of the apertures on the wall 35 of the drum 25. Thus, it may be desirable to offset every other circumferential row of apertures so that the seeds are staggered on the seedbed, or the seeding may require only one longitudinal row of seeds per revolution of the drum whereupon a single longitudinal row of apertures is needed. The combination and arrangements of the apertures thereby predetermine the array in which the seeds are positioned and pressed into the soil.

To contain a supply of seeds in preparation for seeding, a hopper 40 is fixedly mounted to the upper frame structure 13 and, as illustrated in FIG. 1, extends transversely the full length of the peripheral wall 35. The upper end of the hopper 40 is open for receiving the seed, which in operation is evenly distributed along the length of the hopper. The hopper 40 also includes an open delivery end 41 for supporting seed on a portion of the exterior side of the peripheral wall 35. FIG. 3 illustrates the position of the hopper 40 with respect to the drum 25 and the manner in which the seed is held against the rising portion of the peripheral wall 35 by its own weight, as the drum is rotated in a counterclockwise direction. A flexible gasket 42 of felt or a similar suitable material seals the hopper 40 against the drum 25 so that seed cannot escape from the lower end thereof. A shield 43 also extends over the remainder of the upper portion of the drum 25 to prevent foreign materials from interfering with the operation of the drum and to prevent the dislodging of retained seeds while the seeds are being transported to the seedbed.

Individual seeds in the hopper 40 are selected from the mass thereof and held against the apertures 37 for transport to the seedbed by the provision of vacuum means for selectively reducing the atmospheric pressure within the apertures as the drum 25 is rolled along the seedbed. During movement of the apertures 37 through the hopper 40 and to the seedbed, the pressure is reduced so that the seeds in the hopper adhere to the apertures by the reduced pressure and are carried on the periphery of the drum 25 from the hopper to the seedbed. When the apertures contact the seedbed the reduced pressure is interrupted thereby releasing the seeds onto the seedbed so that the weight of the apparatus 10 will press the seeds into the soil.

In the illustrated embodiment, the vacuum means includes a vacuum source such as a vacuum pump 47 powered by a prime mover 48, both of which are mounted on a platform 50 carried by the frame 18. On method of operatively coupling the vacuum pump 47 and the prime mover 48, which typically comprises an internal combustion engine, is shown in FIG. 1. A pulley 52, positively engaged with the output of the prime mover 48, drives a belt 53 which rotates a pulley 54 mounted to a drive shaft 55. A second pulley 57 on the drive shaft 55 is in turn linked by a belt 58 to a pulley 59 on the vacuum pump 47. In operation, a centrifugal or slip clutch (not shown) engages the prime mover 48 with the vacuum pump 47 to provide input thereto.

The vacuum produced by the vacuum pump 47 is transmitted through a hose 63 to a swivel joint 64 mounted to one end of the axle 26. The exterior coupling 65 of the swivel joint 64, which communicates with the hose 63, remains stationary as the axle 26 rotates. The interior coupling 66, however, is fixed to the axle 26 and permits communication with a bore 67 passing axially into the end of the axle 26. A vacuum chamber 70, also fixedly secured to the axle 26 for rotation with the drum 25, communicates with the end of the bore 67 opposite the swivel joint 64 so that the vacuum is produced therein.

To transmit the vacuum to the apertures 37, a plurality of manifolds 72 are mounted within the drum 25, each manifold operatively communicating with at least one longitudinal row of apertures. As illustrated in FIGS. 3 and 5, the manifolds 72 in the disclosed embodiment comprise tubular members which are secured longitudinally to the interior side of the peripheral wall 35 and adjacent the associated longitudinal row of apertures 37. Each manifold 72 includes a plurality of orifices 73 communicating with the interior thereof and positioned so that each orifice 73 communicates with one of the apertures 37 in the manner shown in FIG. 4. One end of each manifold 72 is sealed and passes into bores (not shown) in disk 32, which assists in maintaining the manifolds in position. The opposite end of each manifold 72 extends through bores passing through disk 31, which also supports the manifolds.

Each manifold 72 is operatively interconnected to the vacuum chamber 70 by a flexible hose 75, which is mounted for rotation with the drum 25. Outlets 76 on the periphery of the vacuum chamber 70 are provided to slideably receive one end of each flexible hose 75, and connectors (not shown) couple the other end to the associated manifold 72. In this manner, the vacuum means is completed, and the atmospheric pressure within the interior of the manifolds 72 and thereby within the apertures 37 can be reduced.

Various combinations for interrelating the vacuum means and the apertures 37 are also possible. For example, it may be desirable to retain two or more longitudinal rows of seeds on the apertures 37 during transport to the seedbed and simultaneously release both rows when in close proximity to the seedbed. Thereupon, the two or more associated manifolds 72 would be interconnected to the vacuum chamber 70 by a single flexible hose 75. Likewise, manifolds of different designs than disclosed in the illustrated embodiment could be employed to link apertures other than in a longitudinal row to a single flexible hose. Other possibilities include blocking designated manifolds or flexible hoses so that the vacuum is not transmitted to the apertures thereby increasing the spacing between transverse rows of seed. The interconnections can thus be adapted for particular applications.

The flexible hoses 75 are secured to a cylindrical support 80, which is positioned between the vacuum chamber 70 and the disk 31 at one end of the drum 25 and concentrically mounted coaxially about the axle 26 so as to rotate with the drum. The support 80 includes an outer peripheral surface 81 to which the flexible hoses 75 are affixed by a flexible collar 82 for rotation with the drum 25 and cylindrical support. Furthermore, the hoses 75 are equidistantly spaced circumferentially around the peripheral surface 81 and arranged thereon so as to overlie the support 80 longitudinally. The flexible collar 82 thereby secures the hoses 75 to the peripheral surface 81 by encircling the midportion of each hose, and the collar 82 is held in place by fasteners (not shown) which mount the collar to the peripheral surface between each adjacent hose.

To release the seeds held against the apertures 37 so as to place the seeds on the seedbed for pressing into the soil, the vacuum or reduced atmospheric pressure within the manifolds 72 is interrupted. Thereby, the seeds leave the drum and are simultaneously positioned on the seedbed so that as the seeds are transported directly to the seedbed, they remain thereon by adherence to the soil or by their own weight. In the illustrated embodiment, the seeds are released by interruption of the reduced pressure when the apertures 37 contact the seedbed. This reduces scattering that would result if the seeds were dropped prior to the contact of the seeds and seedbed.

As illustrated in FIGS. 2 and 5, a cam 85 is fixedly mounted to the upper frame structure 13 to provide means in combination with the hose support 80 for successively collapsing each of the flexible hoses 75 during a portion of each rotation of the drum 25. The cam 85 is positioned closely adjacent the peripheral surface 81 so that when the drum 25 is rotated, the collar 82 and each successive hose 75 is forced between the cam and cylindrical support 80 thereby pinching the hose and interrupting the vacuum. A bracket 86 is provided for mounting the cam 85 to the upper frame structure 13, and slots 87 and 88 in the bracket 86 receive mounting bolts 89 and 90 whereby the cam can be adjusted. FIG. 2 demonstrates the position of the cam 85 wherein the flexible hoses 75 are collapsed when a row of apertures 37 rotate immediately below the axle 26 and upon contact with the seedbed.

Studies have been conducted to determine particular design parameters for certain applications of the seed planting apparatus 10. In particular, the effects of varying the aperture diameter, the shape and configuration of the aperture, and the vacuum level applied to the apertures were examined. In designing an apparatus for seeding loblolly pine seeds individually in 2- by 3-inch plots, it was determined that variations in the vacuum level from approximately 2 to 20 inches of mercury had little or no effect on the performance of the apparatus. Thus, when passed through a hoppercontaining a supply of seeds, substantially the same number of apertures failed to retain a seed and substantially the same number of apertures retained more than one seed in tests performed at discreet vacuum levels within the range. An operation level of 4.0 inches of mercury was therefore used in one prototype.

The diameter of the apertures, however, demonstrated a distinct effect on performance, and for loblolly pine seeds, it was found that apertures with a diameter greater than 0.040 inch tended to retain more than one seed. Furthermore, changes in the shape and configuration of the apertures also altered performance. Apertures having a flared opening on the exterior side of the peripheral wall and apertures having a raised, projecting opening on both sides of the peripheral wall were tested, but the straight design illustrated in FIG. 4 was found to retain the greatest number of single seeds when in operation.

In order to improve the performance of the apparatus 10, means for removing excess seeds held against the apertures 37 and before rotation of the apertures from beyond the open delivery end 41 of the hopper 40 is provided. In the illustrated embodiment, such comprises air brush means including an air compressor 93, which is mounted on the platform 50 carried by the frame 18 and operatively coupled to the drive shaft 55 and the prime mover 48 by belt 94, and pulleys 95 and 96, in a manner similar to that as described above for the vacuum pump 47. A nozzle 100 is mounted within the hopper 40 and extends longitudinally along the length of the hopper and adjacent the drum 25. Brackets 101 secure the nozzle 100 to the inside of the hopper 40 at a point above the normal level of seed in the hopper as is shown in FIG. 3. A hose 102 operatively interconnects the nozzle 100 and air compressor 93 to supply compressed air to the nozzle, and a plurality of openings 103 in the nozzle are spaced longitudinally along the length thereof and directed toward the drum 25. Thereby, a stream of directed air from the nozzle openings 103 will blow excess seeds from the apertures 37 before rotation of the apertures from beyond the open end 41 of the hopper 40 and as the apertures pass through the stream of directed air when the drum 25 is rolled along the seedbed. Thus, substantially a single seed will be carried to the seedbed by each aperture. In the application of the apparatus 10 to the seeding of loblolly pine seeds, an air pressure of 1 pound per square inch was found to present optimum operating conditions.

A brush 105 mounted to the frame by members 106 and extending transversely substantially along the length of the drum 25 contacts the exterior side of the peripheral wall 35 at a fixed point between the seedbed and the hopper 40. Means for continuously removing soil or other debris from the apertures 37 and wall 35 and prior to the apertures passing through the hopper 40 as the drum 25 is rolled along the seedbed is thereby provided.

In operation, the apparatus 10 is releasably secured to a towing vehicle by attaching connecting members 17 to a tow bar or the like on the vehicle. After proper adjustments are made to the cam 85, the desired vacuum level on the vacuum pump 47 and the appropriate air pressure on the air compressor 93 are set. A supply of seed is placed in the hopper 40, the prime mover 48 is started so as to commence operation of the vacuum pump 47 and air compressor 93, and the apparatus 10 is moved forward. An extra supply of seed can be retained in container 108.

As the apparatus 10 moves forward, the drum 25 rolls over the seedbed while metering and retaining seeds on the periphery thereof and in the predetermined array. Thus, the vacuum means pulls seeds against the apertures 37 while the air brush means removes substantially all seeds in excess of one adhering to each aperture. The drum 25 continues to rotate to transport the seeds from the hopper 40 and to the seedbed. As the cam 85 collapses the flexible tubes 75, thereby interrupting the reduced air pressure in the apertures 37, the seeds are released from the periphery of the drum substantially at the point at which they contact the seedbed. Upon releasing the seeds, the seeds are pressed into the seedbed by the weight of the apparatus 10 as the drum 25 rolls over the seeds. Brush 105 removes soil and other matter adhering to the drum 25 as the apertures 37 rise from the seedbed and re-enter the hopper 40. As explained above, the seeds will be released and pressed into uniform plots on the seedbed and aligned and spaced in substantially linear rows when the seeds are metered and retained on the periphery of the drum in a uniformly spaced array.

In the drawings and specification, there has been set forth a preferred embodiment of the invention and although specific terms are employed, they are used in a generic and descriptive sense only and not for purposes of limitation.

That which is claimed is:

1. A planting apparatus characterized by the ability to continuously meter seeds onto a seedbed and simultaneously press the seeds into the soil, and so as to facilitate seedling singularization by the placement of the seeds on the seedbed in a predetermined, uniformly spaced array, and comprising a frame;

drum means having a cylindrical peripheral wall and a plurality of apertures aligned in circumferential and longitudinal rows and uniformly spaced circumferentially and longitudinally over substantially the full area of said peripheral wall for selecting and pressing seeds, said drum means being rotatably mounted to said frame so as to be adapted to be moved in rolling contact across the seedbed, and said drum means bearing the weight of said frame and being pressed thereby into the soil;

a plurality of manifolds mounted within said drum means, with each said manifold operatively communicating with at least one of said longitudinal rows of apertures;

hopper means fixedly mounted to said frame and having an open delivery end for supporting seed on a portion of the exterior side of said peripheral wall;

vacuum means for reducing the atmospheric pressure within the interior of said manifolds during only that portion of the movement of the associated rows of apertures through said hopper means and to the seedbed, and wherein said vacuum means comprises vacuum source means mounted on said frame, a plurality of flexible hoses mounted for rotation with said drum and with each hose being operatively connected to respective ones of said manifolds, means for operatively interconnecting said vacuum source means with each of said hoses and thus each of said manifolds, and cam means mounted on said frame for successively collapsing each of said hoses during a portion of each rotation of said drum to thereby interrupt the reduction of pressure within the associated manifold, and cleaning means mounted on said frame for continuously removing any soil and other matter from the exterior side of said peripheral wall as said drum means rotates, whereby as the drum means is rolled along the seedbed, the drum means is cleaned, the seeds in the hopper means are held against the apertures by the reduced pressure and are carried on the peripheral wall of said drum means from said hopper means to the seedbed, and the seeds are released and pressed into the soil by the weight of the apparatus upon reaching the seedbed.

2. The planting apparatus as defined in claim 1 wherein each said manifold comprises a tubular member mounted longitudinally within said drum means and adjacent the associated longitudinal row of said apertures, each of said tubular members having a plurality of orifices communicating with the interior thereof and positioned so that each said orifice communicates with one of said apertures.

3. A seed planting apparatus characterized by the ability to continuously meter seeds onto an unfurrowed seedbed and simultaneously press the seeds into the soil, and so as to facilitate seedling singularization by the pressing of the seeds into the unfurrowed seedbed in a predetermined, uniformly spaced array, and comprising a frame;

means mounted on said frame for releasably attaching the apparatus to a towing vehicle;

drum means having a cylindrical peripheral wall and a plurality of apertures aligned in circumferential and longitudinal rows and uniformly spaced circumferentially and longitudinally over substantially the full area of said peripheral wall for selecting and pressing seeds;

axle means for rotatably mounting said drum means to said frame so that said drum means extends horizontally and transversely substantially between the sides of the frame and so as to be adapted to be moved in rolling contact across the unfurrowed seedbed;

said drum means bearing the weight of said frame means and being pressed thereby into the soil for precisely positioning seeds in predetermined array while avoiding disturbing covering of positioned seeds;

a plurality of manifolds each mounted within said drum means and adjacent an associated longitudinal row of said apertures, with each said manifold operatively communicating with said associated row of apertures;

hopper means fixedly mounted to said frame and having an open delivery end for supporting seed on a portion of the exterior side of said peripheral wall; and vacuum means for reducing the atmospheric pressure within the interior of said manifolds during only that portion of the movement of the associated rows of apertures through said hopper means and to the seedbed, and comprising vacuum source means mounted on said frame, a cylindrical support mounted coaxially about said axle means at one end of said drum means and so as to rotate with said drum means, a plurality of flexible hoses, with each hose being operatively connected to respective ones of said manifolds, and with said hoses being mounted for rotation with said drum means and cylindrical support and so as to longitudinally overlie said cylindrical support in a circumferentially equidistantly spaced arrangement, means for operatively interconnecting said vacuum source means with each of said hoses and thus each of said manifolds, and cam means fixedly mounted to said frame and positioned closely adjacent said cylindrical support for successively collapsing each said hose between said cam means and said cylindrical support during a portion of each rotation of said drum means to thereby interrupt the reduction of pressure within the associated manifold, whereby as the drum is rolled along the seedbed, the seeds in the hopper means are held against the apertures by the reduced pressure and are carried on the peripheral wall of said drum means from said hopper means to the seedbed, and the seeds are released and pressed into the soil by the weight of the apparatus upon reaching the seedbed.

4. The planting apparatus as defined in claim 3 further comprising air brush means mounted to said frame and within said hopper means for removing excess seeds held against said apertures and before rotation of said apertures from beyond said open end of said hopper means, whereby substantially a single seed will be carried to the seedbed by each aperture.

5. The planting apparatus as defined in claim 4 wherein said air brush means comprises an air compressor mounted on said frame, a nozzle extending longitudinally within said hopper means and adjacent said drum means, said nozzle having a plurality of openings spaced longitudinally along its length and directed toward said drum means at a point above the normal level of seed in said hopper means, and means for operatively interconnecting said air compressor with said nozzle, whereby a stream of directed air from said nozzle openings blows excess seeds from said apertures as said apertures pass through the stream of directed air when said drum means is rolled along the seedbed.

6. The planting apparatus as defined in claim 5 wherein said vacuum source means includes a vacuum pump mounted on said frame.

7. The planting apparatus as defined in claim 6 further comprising a prime mover mounted on said frame for powering said vacuum pump and said air compressor.

8. The planting apparatus as defined in claim 4 further comprising means mounted to said frame and contacting the exterior side of said peripheral wall of said drum means at a fixed point adjacent said hopper means, for removing soil or other debris from the apertures as the drum means is rolled along the seedbed and prior to the apertures passing through said hopper means.

* * * * *